Oct. 31, 1967     J. C. MARINACE     3,349,475
PLANAR INJECTION LASER STRUCTURE

Filed Feb. 21, 1963     2 Sheets-Sheet 1

INVENTOR
JOHN C. MARINACE

BY *John F. Ohlandt Jr.*

ATTORNEY

Oct. 31, 1967  J. C. MARINACE  3,349,475
PLANAR INJECTION LASER STRUCTURE
Filed Feb. 21, 1963  2 Sheets-Sheet 2
FIG. 3
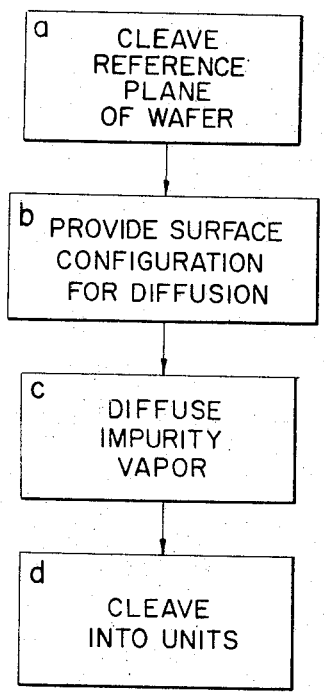
FIG. 4a
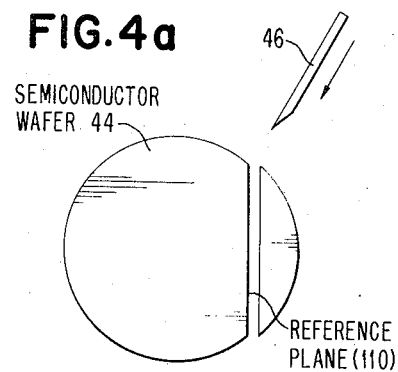
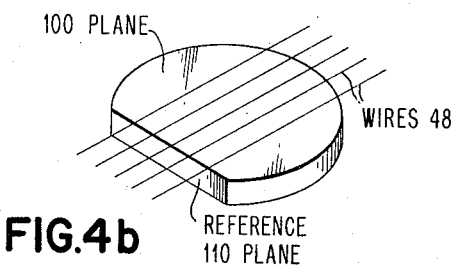
FIG. 4b
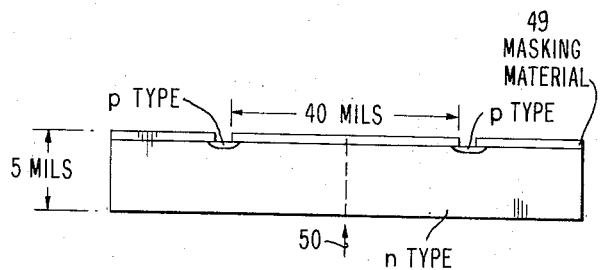
FIG. 4c
FIG. 5
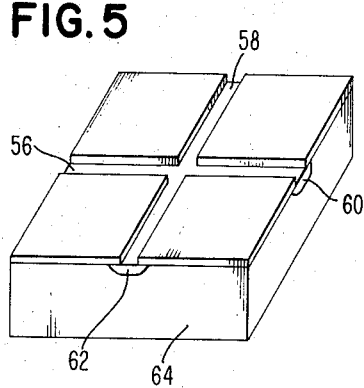
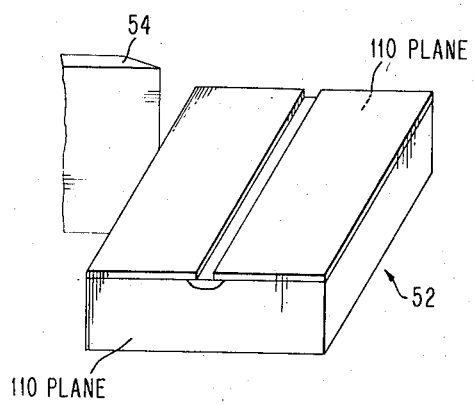
FIG. 4d

United States Patent Office 3,349,475
Patented Oct. 31, 1967

3,349,475
PLANAR INJECTION LASER STRUCTURE
John C. Marinace, Yorktown Heights, N.Y., assignor to International Business Machines Corporation, New York, N.Y., a corporation of New York
Filed Feb. 21, 1963, Ser. No. 260,284
5 Claims. (Cl. 29—578)

The present invention relates to the formation of semiconductor bodies and more particularly to the formation within these bodies of semiconductor devices for use as circuit elements.

It is very important in the production of semiconductor junction devices to provide the elements in very small, precisely determined geometric shapes. Semiconductor junction devices which are to be employed as injection lasers, displaying the phenomenon of stimulated emission of radiation, further require that perfectly plane optical surfaces be provided and the shape and dimensions of the elements must be very accurately controlled.

For a full description of the reecntly discovered phenomenon of stimulated emission of radiation in certain semiconductor devices which have come to be known as injection lasers, reference may be made to the IBM Journal of Research and Development, vol. 7, No. 1, January 1963. A series of articles therein describes the various properties and characteristics of these injection lasers.

Due to the fact that electromagnetic energy in the light region of the spectrum is involved in the above-mentioned laser devices, the requirements on the crystalline body of which the devices are formed are such that the surfaces must be plane parallel, optically reflective and the physical dimensions must be of an order of magnitude of a few multiples of the light wave length.

In order to fabricate successfully an object having a size roughly comparable to the size of a human hair the object or element must be shaped from some larger quantity of the particular material from which the object is to be made. This requires extreme care not only to prevent errors in the actual shaping operation but also to protect the element from damage during the shaping.

The aforesaid difficulties of fabrication have led to the adoption of techniques involving the creation of the active devices or elements within a larger mass of material. Thus, the physical size of the overall structure wherein the device is contained may be relatively large but the significant operating features are limited to an extremely small size and are confined to a portion of the structure.

Accordingly, it is the primary object of the present invention to provide an improved fabrication technique for realizing semiconductor junction devices of the injection laser type by which the actual injection laser element is situated most favorably within a comparatively large crystalline structure.

Another object of the present invention is to provide optically flat surfaces on the tiny injection laser element within the large structure.

Another object of the present invention is to provide precisely oriented laser elements with respect to a reference plane within a semiconductor crystal.

A further object of the present invention is to eliminate process steps used in the prior art formation of an injection laser, while permitting the attainment of a highly directional light output.

Another object of the present invention is to provide protection of the junction from contamination and at the same time to allow for ready thermal conductance from the active junction area.

The fact that extreme care must be exercised in the fabrication of tiny laser devices means that in the processing operation the parent crystal must be so oriented, generally with X-ray equipment, so that the proper dimensions and their relationships may be established. When each dimension and its relationship to others is established, the crystal then must be removed from its support and examined for such misfortunes as overstressing, cracking, formation of dislocations, etc.

In addition to meeting the ordinary requirements placed upon semiconductor junction device formation, advances in the laser art have stressed optical mode enhancement in these light emitting devices and have placed further stringent requirements not only on the scale of dimensions between surfaces, but also on the angle that these surfaces make with each other, as well as the optical reflection properties of these surfaces. The surfaces must not only be optically flat for proper reflection and to prevent light scattering, but the surfaces must also meet at the proper angle and the distances from one reflecting surface to another must be within a selected range of multiples of the wave length involved. Frequently this requires that a surface be flat within a 20th of a wave length and that the surfaces intersect at a precise angle such as 90°.

In accordance with a related prior invention, which forms the subject matter of a prior patent application Ser. No. 234,141, filed on Oct. 30, 1962, now Patent No. 3,247,576, by F. H. Dill, Jr., and R. F. Rutz for a "Method of Fabrication of Crystalline Shapes," and assigned to the assignee of the present invention, certain of the above mentioned difficulties have been overcome. In accordance with that invention a technique has been developed for the fabrication of crystalline bodies on a macroscopic scale which corresponds with the microscopic scale of the internal lattic structure of the given material. In other words, the crystallographic geometry is exploited to control the large-scale geometry of a device. An example of such material therein specified was GaAs. The technique of application Ser. No. 234,141 permits control over dimensions of the order of magnitude of a light wave length while simultaneously providing extremely accurate optically flat surfaces related by accurate geometrical intersections.

The present invention advantageously employs the technique of Ser. No. 234,141 in combination with other steps so as to achieve a highly directional light output. This directional light output is due to the creation within the crystal wafer of a Fabry-Perot type of geometry for optical mode enhancement.

In carrying out the process of the present invention so as to obtain a useful laser structure the following basic steps are employed: A semiconductor crystal wafer is first cut from a large crystalline body along a plane which is perpendicular to the crystallographic plane exhibiting minimum bond strength. For purposes of illustration only, based upon the assumption of the use of GaAs, the starting wafer is sliced from a grown ingot by cutting perpendicular to a 110 plane. The crystal wafer is then cleaved along this 110 plane, which, for GaAs, is the plane exhibiting the minimum bond strength and thus cleaving is quite easily accomplished.

Thereafter a suitable configuration is provided for the top surface of the wafer, which, as an example, is in the 100 plane, such that the diffusion which is to take place into the 100 surface will be delineated by the established surface configuration. This means that there will be a portion of the top surface of the semiconductor wafer which is converted by the diffusion step opposite conductivity type thereby to create within the wafer a preferred geometry for the laser elements. Thereafter individual units are cut from the original wafer and this could involve cleaving through the undiffused portions of the wafer. A further cleaving step is performed and this cleaving is performed parallel to the reference plane at a distance therefrom which is governed by the desired operational length.

The foregoing and other objects, features and advantages of the invention will be apparent from the following more particular description of preferred embodiments of the invention as illustrated in the accompanying drawings.

In the drawings:

FIGURE 3 is a flow diagram indicating the various steps to be taken in accordance with a preferred form of the method of the present invention.

FIGURES 4a, 4b, 4c and 4d illustrate the original crystal structure as well as portions thereof at various stages of the process indicated in FIGURE 3.

FIGURE 5 illustrates another embodiment of a structure having a different geometry.

Figure 1:
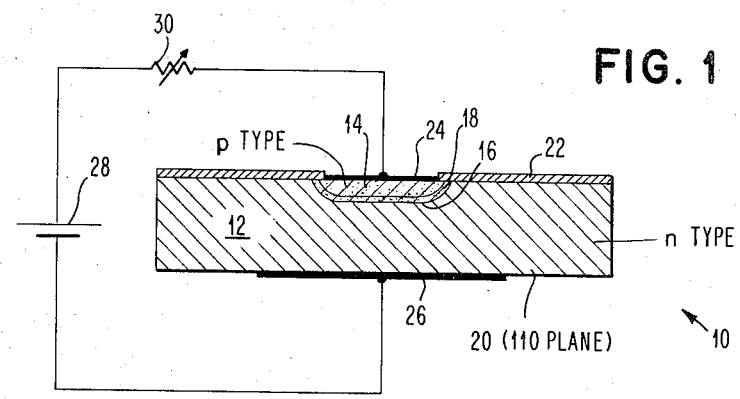
FIGURE 1 is a sectional view of a semiconductor crystal structure, produced in accordance with the present invention, containing a single circuit element, with a schematic bias connected thereto.

Referring now to FIGURE 1 there is shown a sectional view of a semiconductor crystal element or device produced by the process of the present invention. The structure 10 of a semiconductor crystal material suitable for providing laser action, such as GaAs, is constituted of an n-type region 12 and a p-type region 14. The latter is a region formed by a diffusion operation, as will be explained. The regions 12 and 14 define a junction designated by numeral 16. The zone 18 within region 14 is the location whereat stimulated emission occurs. The front face 20 is in the preferred crystallographic plane of minimum bond strength, that is, the 110 plane. Masking material 22 is shown deposited on the top surface of the structure 10. Its uses and advantages will be discussed hereinafter.

Top and bottom ohmic contacts 24 and 26 are made to the body or structure 10 and suitable conductors are attached to these contacts 24 and 26. A biasing circuit is shown connected to the structure 10, consisting of a voltage source, shown as a battery 28 and a variable impedance element 30. The proper application of biasing causes the device shown in FIGURE 1 to operate as an injection laser which is capable of emitting coherent light.

Figure 2:
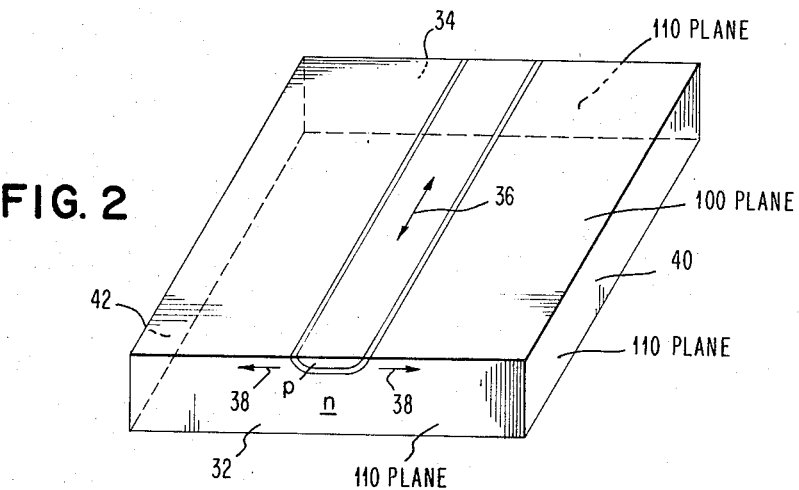
FIGURE 2 is a perspective view of the structure previously shown in FIGURE 1, illustrating the Fabry-Perot type of geometry for optical mode enchancement.

Referring now to FIGURE 2 the optical mode enhancement aspects of the device of the present invention are herein illustrated. The Fabry-Perot geometry previously mentioned is contained in the structure of FIGURE 2. By virtue of the cleaved front and back surfaces 32 and 34, which exist in 110 planes, the end faces of the parallelepiped formed by the p-type region 14 in its lateral contiguity with the n-type region provide optical flatness such that mode enhancement of the radiation emitted in p-type region 14 is attained. The desired mode is indicated by the arrow labeled 36 which denotes the fact that an appreciable fraction of the light is being reflected back and forth between the end surfaces. It is to be noted that the top surface of the structure of FIGURE 2 is in the 100 plane. Also, it should be noted that it is preferable to maintain the length of the parallelepiped on the order of at least ten times the width.

The unwanted optical modes, which are also generated due to injection of charge carriers and their subsequent recombination within the p region of FIGURE 2, are depicted typically by the arrows labeled 38. These modes are substantially absorbed within the n-type region 12 of the semiconductor body. If desired, the sides 40 and 42 could be covered with a material having an index of refraction and a thickness such that transmission of light out of the crystal body is enhanced.

Referring now to FIGURE 3, there is shown a flow chart illustrating the various steps to be followed in carrying out one form of the method of the present invention.

In FIGURE 4 the device or structure is shown at various stages in the method. A semiconductor wafer 44 which has been cut from a parent crystal such that its major surface is perpendicular to the desired reference plane is cleaved with a cleaving tool 46. The tool is placed into engagement with the wafer 44 and sufficient pressure is brought to bear to cause the wafer 44 to cleave along the desired reference plane, namely, the 110 plane, for GaAs. The wafer 44 is of n conductivity type, having a doping concentration on the order of $>4\times10^{17}$ atoms per cc.

The next basic step in the process is the provision of a suface configuration on the crystal wafer 44 such that selective diffusion may be accomplished into the wafer. One scheme for implementation is the masking of the sufrace of the wafer 44. The surface may be masked in accordance with several different techniques. A technique which has been illustrated in FIGURE 4b involves bringing the major surface of the wafer 44 in contact with a plurality of very fine wires, each having a thickness on the order of 0.5 mil. The wires are separated by approximately 40 mils. Then, by a standard vacuum evaporation technique, a masking material 49, such as silicon monoxide (SiO), is deposited onto the top surface of the wafer. Deposition is prevented where the wires contact the top surface. Of course, it will be obvious that a technique such as photolithography may, alternatively, be utilized in which case the SiO is first deposited on the entire surface, and then an etch resist is laid down over the surface. The surface is thereafter selectively illuminated so as to create the configuration desired. The unilluminated portions of the etch resist are removed and the SiO coating is etched through wherever the etch resist is not present.

The thickness of the SiO coating 49 should be on the order of 10,000 to 14,000 A., the requirement being that the thickness be sufficient to allow appreciable diffusion at the unmasked portion and no appreciable diffusion at the masked portions. The next step is the diffusion of an impurity vapor. As shown in FIGURE 4c, which illustrates a portion of the assembly previously shown in FIGURE 4b, an impurity vapor is caused to diffuse into the semiconductor wafer so as to create a small region or zone, typically of p-conductivity type, having a depth on the order of several microns. This is accomplished by using an acceptor impuirty such as Zn which is obtained by heating a quantity of approximately 1 mg./cm.$^3$ of zinc arsenide ($ZnAs_2$). The diffusion operation is carried out at a temperature of 850° for approximately two hours in a sealed quartz tube of ~6 cm.$^3$ volume. Thereafter, the bottom of the structure is lapped so as to provide a total thickness of approximately 5 mils and then the structure as shown in FIGURE 4c is cut as shown by the arrow 50 in two portions so as to provide individual units.

If desired before the step of cutting is performed, a layer of approximately 1 micron of indium may be evaporated onto the top surface so as to make contact with the p-type region formed by diffusion. This will enable ready attachable of a conductor to the p-type region.

As shown in FIGURE 4d after the initial cutting to produce single device 52, a cleaving step is performed by a cleaving tool 54 to provide the desired operational length. The cleaving is, again, along 110 plane and results in having perfectly parallel opposed faces.

Although the selective diffusion has been explained as produced by a surface configuration which involved masking of the surface by the use of a masking material such as SiO, the surface configuration or pattern may be realized by other means. For example, a series of parallel grooves may be cut into the top surface of the wafer shown in FIGURE 4b. Thereafter the normal diffusion step is carried out across the entire top surface of the crystal and into the grooves. Following this step the top surface of the wafer is lapped down so as to remove the material into which the impurity has diffused except where the diffusant has penetrated down below the grooves. Of course in this instance the elimination of a mask on the surface means that, if it is desired that the junction be passivated, a coating will have to be applied after the diffusion has taken place. Likewise, if desired, an epitaxial growth of GaAs or other suitable epitaxially compatible material could be made on the upper surface, followed by removal until only the grown material in the groove remains.

The embodiment as indicated in FIGURES 4a through 4d, illustrating one form of the process of the present invention, resulted in a simple line configuration for the active laser element. It will, however, be understood by those skilled in the art that many different configurations may be selected. As illustrated in FIGURE 4, an especially favorable geometry, where it is desired to provide interacting laser elements, is produced by a surface configuration which has the shape of a cross, with two intersecting portions 56 and 58. Thus, in the structure of FIGURE 5, it will be seen that two laser devices are formed by the two simultaneously diffused p-type regions 60 and 62 in contact with the n-type substrate 64. In this case, for the desired action, it is preferable that all four sides of the structure be cleaved so that all active surfaces will be optically flat.

What has been described is a novel technique which enables the formation of extremely small light-emitting semiconductor junction devices which are contained within a large crystalline structure and are substantially perfectly oriented within that structure to provide a highly directional light output.

While the invention has been particularly shown and described with reference to preferred embodiments thereof, it will be understood by those skilled in the art that the foregoing and other changes in form and details may be made therein without departing from the spirit and scope of the invention.

What is claimed is:
1. A process of producing injection laser devices comprising the steps of:
  cleaving a semiconductor crystalline wafer along a crystallographic plane of minimum bond strength thereby establishing a reference plane,
  bringing a major surface of said wafer into contact with a plurality of spaced wires to produce a desired surface configuration perpendicular to said reference plane,
  depositing a masking material upon said major surface of said semiconductor wafer except where said wires are located, thereby defining a preferential mask for diffusion on said major surface,
  removing said wires after said depositing step, diffusing an impurity into the portions of said major surface which are not covered by said deposited masking material, thereby to create, selectively, opposite conductivity type regions at said surface, and
  cleaving along planes parallel to said reference plane to produce individual laser units having opposed optically flat surfaces.
2. A process as defined in claim 1 wherein said semiconductor crystalline wafer is constituted of gallium arsenide, and
  said reference plane is in the 110 plane of the crystal and said major surface is in the 100 plane of the crystal.
3. A process as defined in claim 1 wherein said semiconductor crystal wafer is constituted of gallium arsenide,
  said masking material is silicon monoxide, and
  said impurity is zinc.
4. A process of producing an injection laser device comprising the steps of:
  providing an n conductivity type gallium arsenide wafer having a doping concentration on the order of $4 \times 10^{17}$ atoms per cc.,
  cleaving said wafer in a plane of minimum bond strength to establish a reference plane,
  selectively depositing silicon monoxide upon a major surface of said semiconductor wafer to define a plurality of discrete zones of said surface extending perpendicularly from said reference plane where diffusion may take place,
  diffusing a quantity of zinc vapor through the discrete zones into the surface of said wafer to create a plurality of p conductivity type regions, each in the shape of a parallelepiped,
  cutting along planes parallel to the major axes of said parallelepipeds to produce individual sections, and
  cleaving said sections at selected distances in planes parallel to said reference plane to produce discrete devices.
5. A process of producing an injection laser device comprising the steps of:
  providing a semiconductor wafer of one conductivity type,
  cleaving said wafer in a plane of minimum bond strength to establish a reference plane,
  selectively depositing a masking material upon a major surface of said semiconductor wafer to define a plurality of discrete zones of said surface extending perpendicularly from said reference plane where diffusion may take place,
  diffusing a quantity of a selected impurity vapor through the discrete zones into the surface of said wafer to create a plurality of opposite conductivity type regions, each in the shape of a parallelepiped,
  cutting along planes parallel to the major axes of said parallelepipeds to produce individual sections, and
  cleaving said sections at selected distances in planes parallel to said reference planes to produce discrete devices.

References Cited
UNITED STATES PATENTS

| | | | |
|---|---|---|---|
| 2,561,411 | 7/1951 | Pfann | 148—187 XR |
| 2,796,562 | 6/1957 | Ellis | 148—187 XR |
| 3,193,418 | 4/1965 | Cooper | 148—189 |
| 3,245,002 | 4/1966 | Hall | 331—94.5 |
| 3,247,576 | 4/1966 | Dill | 29—155.5 |

WILLIAM I. BROOKS, *Primary Examiner.*